(12) United States Patent
Choi et al.

(10) Patent No.: US 11,919,773 B2
(45) Date of Patent: Mar. 5, 2024

(54) METHOD FOR MODIFYING SURFACE OF ACTIVATED CARBON AND FILTER FOR WATER PURIFIER

(71) Applicants: LG Electronics Inc., Seoul (KR); INHA UNIVERSITY RESEARCH AND BUSINESS FOUNDATION, Incheon (KR)

(72) Inventors: Yuseung Choi, Seoul (KR); Suhye Woo, Seoul (KR); Sangduck Lee, Seoul (KR); Seonghwang Kim, Seoul (KR); Soojin Park, Seoul (KR); Dongbeom Seong, Gyeonggi-do (KR); Yeongrae Son, Gyeonggi-do (KR)

(73) Assignees: LG Electronics Inc., Seoul (KR); Inha University Research and Business Foundation, Incheon (KR)

( * ) Notice: Subject to any disclaimer, the term of this patent is extended or adjusted under 35 U.S.C. 154(b) by 295 days.

(21) Appl. No.: 16/887,276

(22) Filed: May 29, 2020

(65) Prior Publication Data

US 2021/0001256 A1 Jan. 7, 2021

(30) Foreign Application Priority Data

Jul. 5, 2019 (KR) .......................... 10-2019-0081646

(51) Int. Cl.
*C01B 32/354* (2017.01)
*B01D 24/46* (2006.01)
(Continued)

(52) U.S. Cl.
CPC ............ *C01B 32/354* (2017.08); *B01D 24/46* (2013.01); *B01D 35/30* (2013.01); *B01D 39/16* (2013.01);
(Continued)

(58) Field of Classification Search
CPC ................ B01D 39/16; B01D 39/2055; B01D 39/2062; B01D 24/46; B01D 2251/104;
(Continued)

(56) References Cited

U.S. PATENT DOCUMENTS 5,990,041 A * 11/1999 Chung .................. C01B 32/382
502/436
8,409,520 B2 * 4/2013 Ota ...................... B01D 53/047
96/108

(Continued)

FOREIGN PATENT DOCUMENTS

KR WO2018106031 A1 * 6/2018 ............. B01D 35/04
WO WO-2018106031 A1 * 6/2018 ............. B01D 35/04

OTHER PUBLICATIONS

Chiang et al. ((2002). Ozonation of activated carbon and its effects on the adsorption of VOCs exemplified by methylethylketone and benzene. Chemosphere, 47(3), 267-275) (Year: 2002).*

(Continued)

*Primary Examiner* — Gabriel E Gitman
(74) *Attorney, Agent, or Firm* — Fish & Richardson P.C.

(57) ABSTRACT

A method is described for treating activated carbon configured to be included in a carbon block of a filter for a water purifier. The method includes: inserting the activated carbon into a chamber; injecting ozone generated from an ozone generator into the chamber, and applying pressure to the chamber; and modifying a surface of the activated carbon inserted into the chamber based on applying the pressure to the chamber that holds the ozone and the activated carbon.

20 Claims, 17 Drawing Sheets

(51) Int. Cl.
*B01D 35/30* (2006.01)
*B01D 39/16* (2006.01)
*B01D 39/20* (2006.01)
*C01B 32/336* (2017.01)

(52) U.S. Cl.
CPC .... *B01D 39/2062* (2013.01); *B01D 2251/104* (2013.01); *B01D 2253/102* (2013.01); *C01B 32/336* (2017.08)

(58) Field of Classification Search
CPC .. B01D 2253/102; B01D 35/30; B01D 53/02; B01D 53/04; B01D 53/0438; B01D 53/0454; B01D 53/0462; B01D 53/047; B01D 53/0473; B01D 53/0476; B01D 53/053; B01D 39/2058; C01B 32/336; C01B 32/354; C02F 1/283; C02F 1/285; C02F 1/286; B01J 2220/4812; A61L 2/202
See application file for complete search history.

(56) References Cited

U.S. PATENT DOCUMENTS

| | | | | |
|---|---|---|---|---|
| 2004/0158087 | A1* | 8/2004 | Strohmaier | C07C 53/126 554/2 |
| 2016/0059211 | A1* | 3/2016 | Redding | C01B 32/348 502/416 |
| 2017/0036983 | A1* | 2/2017 | Lee | C09C 1/44 |
| 2018/0327264 | A1* | 11/2018 | Sato | C01B 13/11 |

OTHER PUBLICATIONS

Mawhinney et al. (2001, FTIR study of the oxidation of amorphous carbon by ozone at 300 K—Direct COOH formation. Carbon, 39(8), 1167-1173) (Year: 2001).*
WO2018106031A1_ENG (Espacenet machine translation of Choi) (Year: 2018).*
Valdés et al. (2002, Effect of ozone treatment on surface properties of activated carbon. Langmuir, 18(6), 2111-2116) (Year: 2002).*

* cited by examiner

FIG. 3
FIG. 4
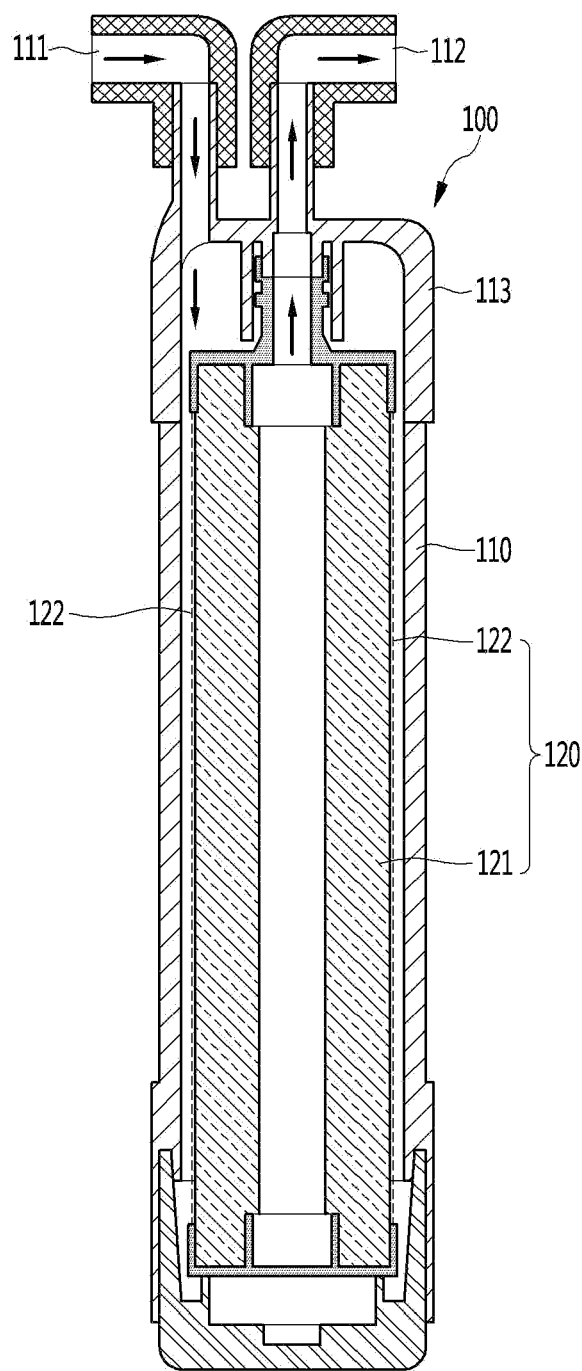
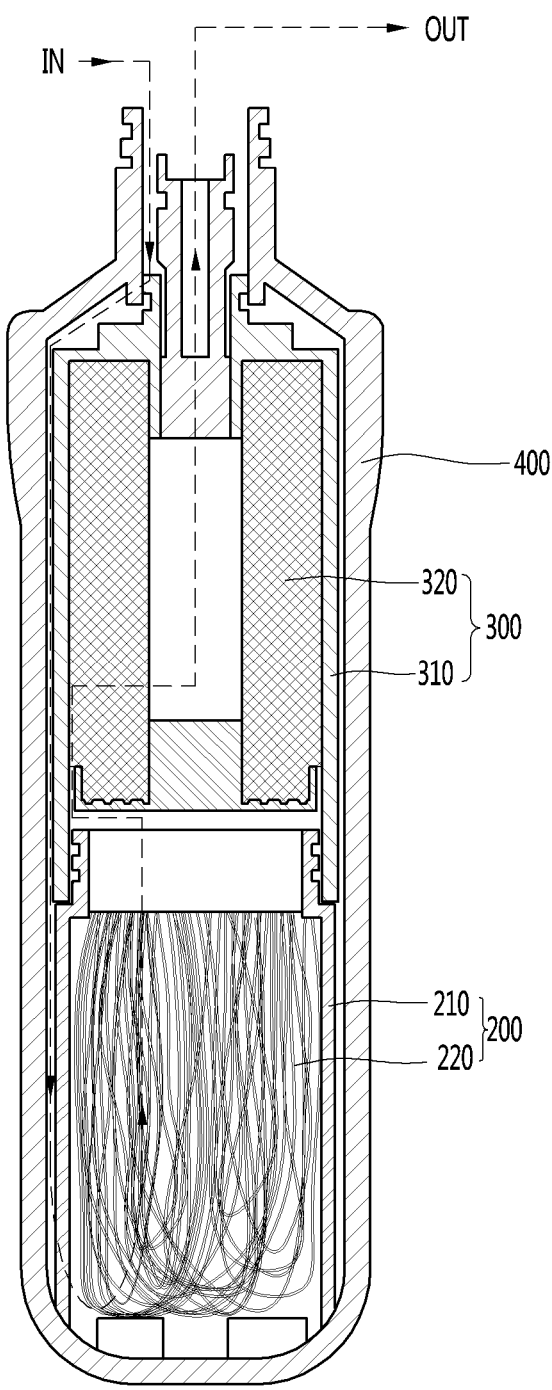

FIG. 5

| ELEMENT | SAMPLING | TIME(s) | CHANGE AMOUNT (ppm) | REMOVAL RATE (%) |
|---|---|---|---|---|
| Mn | pristine MiAC | 0 | 11.11 → 11.11 | 0 |
| | | 30 | 11.11 → 10.38 | 6.57 |
| | | 60 | 11.11 → 10.61 | 4.5 |
| | | 180 | 11.11 → 10.72 | 3.51 |
| | | 300 | 11.11 → 11.34 | - |
| | | 600 | 11.11 → 11.46 | - |
| | pristine MeAC | 0 | 11.11 → 11.11 | 0 |
| | | 30 | 11.11 → 7.769 | 30.1 |
| | | 60 | 11.11 → 7.805 | 29.7 |
| | | 180 | 11.11 → 8.384 | 24.5 |
| | | 300 | 11.11 → 8.034 | 27.7 |
| | | 600 | 11.11 → 8.258 | 25.7 |

FIG. 6

| ELEMENT | SAMPLING | TIME(s) | CHANGE AMOUNT (ppm) | REMOVAL RATE (%) |
|---|---|---|---|---|
| Zn | pristine MiAC | 0 | 10.47 → 10.47 | 0 |
| | | 30 | 10.47 → 9.471 | 9.54 |
| | | 60 | 10.47 → 9.986 | 4.62 |
| | | 180 | 10.47 → 9.579 | 8.51 |
| | | 300 | 10.47 → 9.355 | 10.6 |
| | | 600 | 10.47 → 8.88 | 15.2 |
| | pristine MeAC | 0 | 11.07 → 11.07 | 0 |
| | | 30 | 11.07 → 6.885 | 37.8 |
| | | 60 | 11.07 → 6.843 | 38.2 |
| | | 180 | 11.07 → 7.035 | 36.4 |
| | | 300 | 11.07 → 6.794 | 38.6 |
| | | 600 | 11.07 → 6.891 | 37.8 |

Pristine MiAC survey scan

Pristine MeAC survey scan

FIG. 9

| Sample | C (at%) | O (at%) |
|---|---|---|
| pristine MiAC | 94.2 | 5.8 |
| pristine MeAC | 89.1 | 10.9 |

FIG. 10

| SAMPLE NAME | SAMPLE THICKNESS (mm) | OXYGEN FLOW RATE (L/min) | OZONE DISCHARGE AND PRESSURE (MPa) | SAMPLE CHAMBER OZONE PRESSURE (bar) | OZONE TREATMENT TIME (min) | ELEMENT CONTENT (at%) | |
|---|---|---|---|---|---|---|---|
| | | | | | | CARBON | OXYGEN |
| PRESENT EXAMPLE 1 | 10 | 4 | 0.05 | 1 | 1 | 93.6 | 6.4 |
| PRESENT EXAMPLE 2 | 10 | 4 | 0.05 | 1 | 10 | 91.5 | 8.5 |
| PRESENT EXAMPLE 3 | 10 | 4 | 0.05 | 1 | 30 | 91.1 | 8.9 |
| PRESENT EXAMPLE 4 | 10 | 4 | 0.05 | 1 | 60 | 89.0 | 11.0 |
| PRESENT EXAMPLE 5 | 10 | 4 | 0.05 | 1 | 90 | 90.6 | 9.4 |
| PRESENT EXAMPLE 6 | 10 | 4 | 0.05 | 1 | 120 | 92.8 | 7.2 |
| PRESENT EXAMPLE 7 | 10 | 4 | 0.05 | 1 | 150 | 94.4 | 5.6 |
| PRESENT EXAMPLE 8 | 10 | 4 | 0.05 | 1 | 1 | 91.2 | 8.8 |
| PRESENT EXAMPLE 9 | 10 | 4 | 0.05 | 1 | 10 | 88.8 | 11.2 |
| PRESENT EXAMPLE 10 | 10 | 4 | 0.05 | 1 | 30 | 88.8 | 11.7 |
| PRESENT EXAMPLE 11 | 10 | 4 | 0.05 | 1 | 60 | 88.3 | 11.3 |
| PRESENT EXAMPLE 12 | 10 | 4 | 0.05 | 1 | 120 | 88.7 | 21.4 |
| PRESENT EXAMPLE 13 | 10 | 4 | 0.05 | 1 | 180 | 78.6 | 20.1 |
| PRESENT EXAMPLE 14 | 10 | 4 | 0.05 | 1 | 240 | 79.9 | 16.8 |
| PRESENT EXAMPLE 15 | 10 | 4 | 0.05 | 1 | 300 | 85.3 | 14.7 |
| COMPARATIVE EXAMPLE 1 | - | - | - | - | - | 94.2 | 5.8 |
| COMPARATIVE EXAMPLE 2 | - | - | - | - | - | 89.1 | 10.9 |

FIG. 11

| Sample | | C (at%) | O (at%) |
|---|---|---|---|
| MiAC | pristine MiAC | 94.2 | 5.8 |
| | oMiAC10 | 91.5 | 8.5 |
| | oMiAC30 | 91.1 | 8.9 |
| | oMiAC60 | 89.0 | 11.0 |
| | oMiAC120 | 92.8 | 7.2 |
| MeAC | pristine MeAC | 89.1 | 10.9 |
| | oMeAC10 | 88.8 | 11.2 |
| | oMeAC30 | 88.3 | 11.7 |
| | oMeAC60 | 88.7 | 11.3 |
| | oMeAC120 | 78.6 | 21.4 |

O DESCREASE (at oMiAC60 row)
O INCREASE (at oMeAC60 row)

FIG. 12

| SAMPLE NAME | ELEMENT CONTENT (at%) | |
|---|---|---|
| | MANGANESES | ZINC |
| PRESENT EXAMPLE 1 | 6.7 | 13.7 |
| PRESENT EXAMPLE 2 | 23.4 | 15.8 |
| PRESENT EXAMPLE 3 | 26.1 | 12.1 |
| PRESENT EXAMPLE 4 | 34.3 | 33.2 |
| PRESENT EXAMPLE 5 | 30.3 | 27.6 |
| PRESENT EXAMPLE 6 | 22.3 | 11.5 |
| PRESENT EXAMPLE 7 | 19.7 | 10.2 |
| PRESENT EXAMPLE 8 | 29.1 | 38.5 |
| PRESENT EXAMPLE 9 | 32.9 | 40.1 |
| PRESENT EXAMPLE 10 | 45.2 | 57.2 |
| PRESENT EXAMPLE 11 | 40.8 | 50.7 |
| PRESENT EXAMPLE 12 | 94.9 | 97.5 |
| PRESENT EXAMPLE 13 | 92.4 | 94.3 |
| PRESENT EXAMPLE 14 | 72.6 | 77.8 |
| PRESENT EXAMPLE 15 | 48.6 | 52.7 |
| COMPARATIVE EXAMPLE 1 | 0 | 14.1 |
| COMPARATIVE EXAMPLE 2 | 27.7 | 37.8 |

FIG. 13

| MATERIAL | OZONE TREATMENT TIME (min) | SAMPLE NAME | ELEMEMT CONTENT (at%) | | REMOVAL RATE(%) (@ 30 min) | |
|---|---|---|---|---|---|---|
| | | | C | O | Mn | Zn |
| MiAC | 0 | MiAC | 94.2 | 5.8 | 0 | 15.0 |
| | 10 | oMiAC10 | 91.5 | 8.5 | 23.4 | 15.8 |
| | 30 | oMiAC30 | 91.1 | 8.9 | 26.1 | 12.1 |
| | 60 | oMiAC60 | 89 | 11 | 34.1 | 33.2 |
| | 120 | oMiAC120 | 92.8 | 7.2 | 22.4 | 11.5 |

FIG. 14

| MATERIAL | OZONE TREATMENT TIME (min) | SAMPLE NAME | ELEMEMT CONTENT (at%) | | REMOVAL RATE(%) (@ 30 min) | |
|---|---|---|---|---|---|---|
| | | | C | O | Mn | Zn |
| MeAC | 0 | MeAC | 89.1 | 10.9 | 30.0 | 38.0 |
| | 10 | oMeAC10 | 88.8 | 11.2 | 32.9 | 40.1 |
| | 30 | oMeAC30 | 88.3 | 11.7 | 45.2 | 57.2 |
| | 60 | oMeAC60 | 88.7 | 11.3 | 40.8 | 50.7 |
| | 120 | oMeAC120 | 78.6 | 21.4 | 94.9 | 97.5 |

METHOD FOR MODIFYING SURFACE OF ACTIVATED CARBON AND FILTER FOR WATER PURIFIER

CROSS-REFERENCE TO RELATED APPLICATION

This application claims a benefit under 35 U.S.C. § 119(a) of Korean Patent Application No. 10-2019-0081646, filed on Jul. 5, 2019, in the Korean Intellectual Property Office, the entire disclosure of which is incorporated herein by reference for all purposes.

TECHNICAL FIELD

The present specification relates to a method for modifying a surface of activated carbon mixed as a main material in a carbon block and a filter for a water purifier including a carbon block in which surface-modified activated carbon is mixed.

BACKGROUND

A water purifier is an apparatus that can purify raw water such as tap water or groundwater. For example, the water purifier may convert the raw water into drinking water through various water purification schemes to provide the drinking water.

In some cases, in order to produce purified water, the raw water may be processed through precipitation, filtration, sterilization, and the like. Harmful substances may be removed through these processes.

In some examples, the water purifier may be equipped with various filters to purify the raw water. These filters may be classified into a sediment filter, an activated carbon filter, an ultrafiltration (UF) hollow fiber membrane filter, a reverse osmosis (RO) membrane filter, and the like.

The sediment filter may be a filter for precipitating contaminants or floating matters with large particles in the raw water. The activated carbon filter is a filter for adsorbing and removing contaminants, residual chlorine, volatile organic compounds, or odor-causing factors with small particles.

In some cases, the activated carbon filter may include two activated carbon filters. For instance, the activated carbon filter may include a pre carbon filter provided on a raw water side and a post carbon filter provided on a purified water side. The post carbon filter may be provided to improve taste of water by removing the odor-causing substances that mainly affect the taste of the purified water.

In some cases, both the UF hollow fiber membrane filter and the RO membrane filter may be used selectively.

Recently, a demand for the water purifier has increased significantly. In some cases, various requirements for the water purifier may be difficult to be satisfied at the same time.

For example, a heavy metal may be removed by applying the RO membrane filter, but it may be difficult to secure a flow rate of the purified water. That is, it may take a long time to obtain an amount of purified water as desired.

In some cases, where the UF hollow fiber membrane filter is used, although a high flow rate may be secured, it may be difficult to use groundwater or tap water in a contaminated region as the raw water due to the heavy metal in the water.

In some cases, both heavy metal removal and high flow rate securement may be desired. However, it may be difficult to secure the high flow rate when using the RO membrane filter to remove the heavy metal, and it may be difficult to remove the heavy metal when using the UF hollow fiber membrane filter to secure the high flow rate.

In some cases, heavy metal removal filters may remove a total of eight kinds of heavy metals in water including arsenic (As), selenium (Se), lead (Pb), aluminum (Al), mercury (Hg), chromium (Cr), iron (Fe), and copper (Cu).

In recent years, however, there has been a need to remove eleven kinds of heavy metals including not only the above eight kinds but also cadmium (Cd), manganese (Mn), and zinc (Zn).

In some cases, the water purifier filter may be insufficient to completely remove the eight kinds of heavy metals while ensuring the high flow rate. Further, the cadmium (Cd), manganese (Mn), zinc (Zn), and the like in the water may not be removed at all by the water purifier filter.

In some examples, the water purifier filter may include a carbon block including micro pore activated carbon, which is not surface-treated, a heavy metal removing material, and a binder.

The activated carbon may remove disinfection by-products (chloroform), residual chlorine, taste, and odor components.

However, the activated carbon that is not surface-treated may have insufficient effect of removing the heavy metals.

The activated carbon, in some cases, may be difficult to adsorb water molecules because a surface thereof is hydrophobic. Thus, a heavy metal may not be removed at all or very little depending on a type thereof.

In some examples, where the surface treatment of the activated carbon is not performed, a heavy metal removal effect may be insufficient in which heavy metals may not be removed at all or very little depending on the type of the heavy metals.

SUMMARY

The present disclosure describes a method for treating a surface of activated carbon and a filter for a water purifier including surface-treated activated carbon to increase oxygen functional groups on the surface of the activated carbon by oxidizing the activated carbon and increasing oxygen content.

The present disclosure describes a method for treating a surface of activated carbon and a filter for a water purifier including surface-treated activated carbon that may improve a performance of removing heavy metals in water while maintaining the same volume.

The present disclosure describes a filter for a water purifier that may effectively remove heavy metals in water, including cadmium (Cd), manganese (Mn), and zinc (Zn) in the water.

The present disclosure describes a filter for a water purifier that may remove heavy metals such as lead, mercury, arsenic, iron, aluminum, copper, and the like in water while securing a treatment capacity.

The present disclosure describes a filter for a water purifier that may remove at least nine kinds of heavy metals.

The present disclosure describes a filter for a water purifier that may be applied directly to an existing water purifier without changing a shape or arrangement of a filter applied to the water purifier.

The present disclosure describes a filter for a water purifier that may increase space utilization by reducing a volume of the filter in which the filter is a heterogeneous filter disposed longitudinally in a single filter housing.

The method for treating a surface of activated carbon includes applying ozone, which is highly reactive, to form micro pores or meso pores to oxidize the surface of the activated carbon, thereby forming oxygen functional groups on the surface of the activated carbon and improving a performance of removing heavy metals in water.

According to one aspect of the subject matter described in this application, described is a method for treating activated carbon configured to be included in a carbon block of a filter for a water purifier. The method includes inserting the activated carbon into a chamber; injecting ozone generated from an ozone generator into the chamber, and applying pressure to the chamber; and modifying a surface of the activated carbon inserted into the chamber based on applying the pressure to the chamber that holds the ozone and the activated carbon.

Implementations according to this aspect may include one or more of the following features. For example, modifying the surface of the activated carbon may include forming micro pores and meso pores in the activated carbon, where a volume of the micro pores is 85 to 95% of a total pore volume of the activated carbon, or a volume of the meso pores is 5 to 15% of the total pore volume of the activated carbon.

In some implementations, inserting the activated carbon into the chamber may include inserting the activated carbon having a thickness of 10 mm or less into the chamber. In some implementations, injecting the ozone may include generating the ozone by the ozone generator using oxygen as a raw material. In some implementations, generating the ozone comprising generating the ozone by the ozone generator using an oxygen bombe having an oxygen concentration of 90% or more of a total weight of the oxygen bombe.

In some examples, inserting the activated carbon or injecting the ozone may include inflowing high purity oxygen gas into the chamber for 10 to 60 minutes. In some examples, injecting the ozone may include maintaining an oxygen inflow into the ozone generator with a flow rate in a range from 0.2 to 5 L/min of oxygen.

In some implementations, injecting the ozone may include maintaining an internal pressure of a discharge tube of the ozone generator at a predetermined range. For example, maintaining the internal pressure of the discharge tube may include maintaining the internal pressure of the discharge tube in a range of 0.001 to 0.1 MPa.

In some implementations, injecting the ozone and modifying the surface of the activated carbon may include: maintaining a closed state of a discharge pipe, where the discharge pipe is connected to the chamber and configured to communicate with an interior of the chamber based on operation of a valve.

In some examples, maintaining the closed state of the discharge pipe may include closing the valve, where the discharge pipe is made of one of Teflon, polypropylene, stainless steel (SUS), or rubber. In some examples, modifying the surface of the activated carbon may include maintaining the chamber in a closed state. In some examples, modifying the surface of the activated carbon may include maintaining an ozone pressure in the chamber in a range of 0.05 to 1.5 bar. In some examples, modifying the surface of the activated carbon may be performed for 60 to 300 minutes.

According to another aspect, a filter for a water purifier includes a filter housing that defines an inlet and an outlet, and a filter module disposed inside the filter housing and configured to purify water received through the inlet and supply purified water to the outlet. The filter module may a carbon block including activated carbon, and the activated carbon has been treated by operations according to the method described above. In other words, the operations includes inserting the activated carbon into a chamber, injecting ozone generated from an ozone generator into the chamber, and applying pressure to the chamber, and modifying a surface of the activated carbon inserted into the chamber based on applying the pressure to the chamber that holds the ozone and the activated carbon.

In some implementations according to this aspect may include one or more of the features described above with respect to the method for treating activated carbon.

In some implementations, the activated carbon may be oxidized, and the oxygen content of the activated carbon may be increased to increase the oxygen functional groups on the surface of the activated carbon.

In some implementations, the carbon block with the treated activated carbon may improve the heavy metal removal performance in the water, while maintaining the same volume.

In some implementations, the heavy metals in the water, including the cadmium (Cd), the manganese (Mn), and the zinc (Zn), may be removed reliably.

Heavy metals such as the lead, the mercury, the arsenic, the iron, the aluminum, the copper, and the like in the water may be removed while securing a treatment capacity.

In some implementations, at least nine kinds of the heavy metals may be removed.

In some implementations, the water purification process may take place several times by the plurality of filters so that the removal of the various foreign substances including the heavy metals may be more reliably performed.

In some implementations, where only the material of the filter is changed, and the shape or arrangement of the filter applied to the water purifier is not changed, the filter of the present disclosure may be directly applied to the existing water purifier.

In some implementations, the heterogeneous filter may be longitudinally disposed in the single filter housing to reduce the volume of the filter. Thus, the space utilization may be improved and further the water purifier may be implemented slimly.

BRIEF DESCRIPTION OF THE DRAWINGS

FIG. 3 is a cross-sectional view showing an example of a pre carbon filter.

FIG. 4 is a cross-sectional view showing an example of a composite filter.

FIG. 5 is a table showing an example of manganese removal rates of pristine activated carbon.

FIG. 6 is a table showing an example of zinc removal rates of pristine activated carbon.

FIG. 9 is a table showing examples of carbon and oxygen contents of pristine MiAC and MeAC.

FIGS. 10 and 11 are tables showing examples of changes in carbon and oxygen contents of activated carbon with various ozone treatment durations.

FIGS. 12 to 14 are tables showing examples of heavy metal removal rates of activated carbon with various ozone treatment durations.

DETAILED DESCRIPTION

Hereinafter, one or more implementations of the present disclosure will be described in detail with reference to the drawings. However, the spirit of the present disclosure is not limited to implementations to be presented below. Those skilled in the art who understand the spirit of the present disclosure may readily implement other embodiments that fall within the scope of the same idea by adding, modifying, deleting, and adding components, but it will also be within the scope of the present disclosure.

Figure 1:
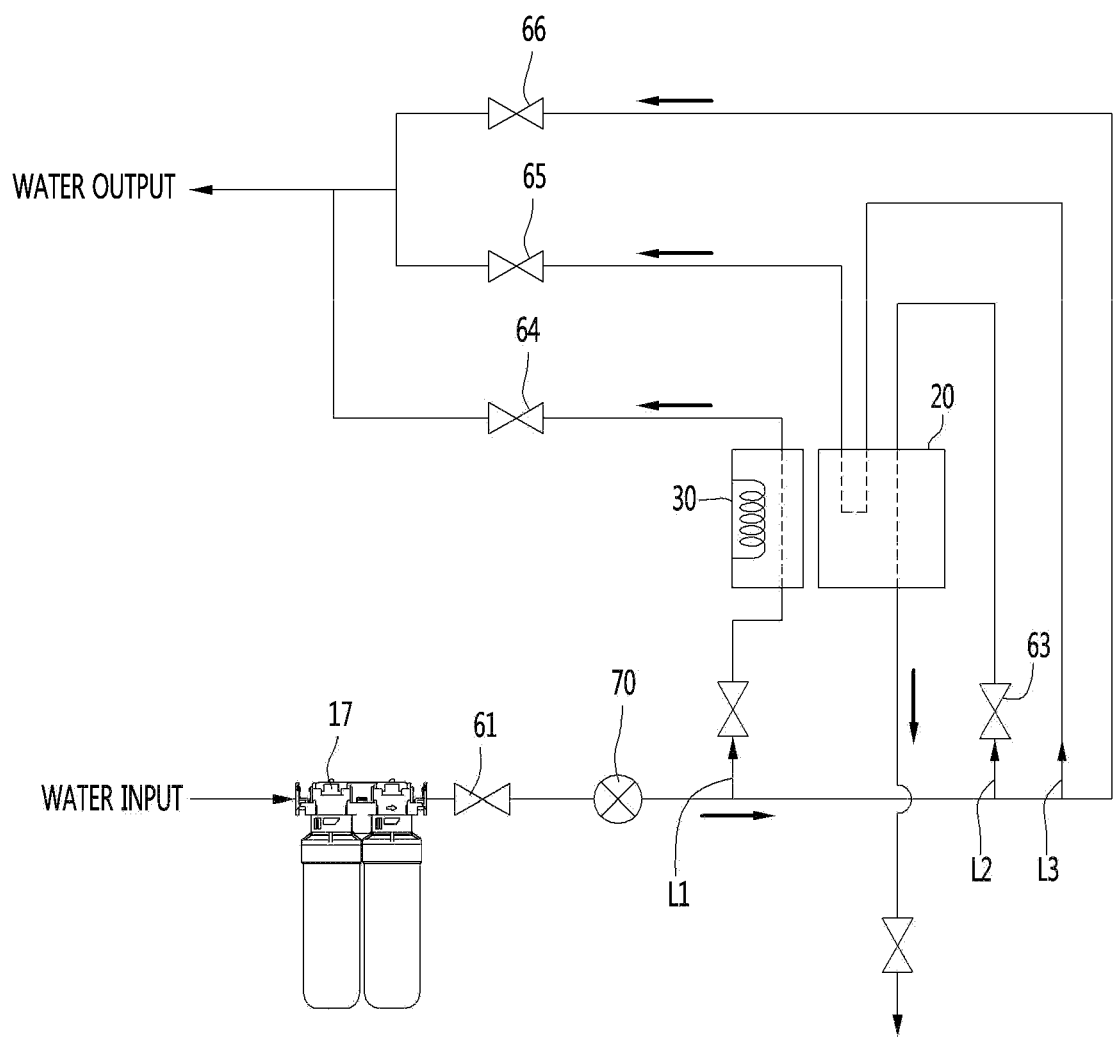
FIG. 1 is a water pipe diagram showing an example of a water purifier.

FIG. 1 is a water pipe diagram showing an example of a water purifier.

The water purifier may be configured to purify water supplied directly from an external water source, cool or heat the purified water, and then discharge the cooled or heated water. For example, the water purifier may be a direct-type cold and warm water purifier.

In some examples, the direct-type water purifier may refer to a water purifier in which purified water is extracted in a user's purified water extraction operation without a reservoir for storing the purified water therein.

In some cases, the water purifier may be formed integrally with a refrigerator.

In some cases, the water purifier may be an under-sink water purifier in which a body is installed at a lower portion of a sink and a water discharge hole is installed outside the sink.

Referring to FIG. 1, the water purifier may include a water supply line L that connects a water supply source to the water discharge hole of the water purifier; various valves and water purification parts may be connected to the water supply line L.

For example, the water supply line L may be connected to the water supply source such as a faucet in home or the like. Further, a filter assembly 17 may be disposed at an arbitrary point of the water supply line L to filter foreign substances contained in drinking water supplied from the water supply source.

In some examples, a water supply valve 61 and a flow rate sensor 70 may be sequentially arranged on the water supply line L connected to an outlet end of the water supply line L. Therefore, when a supply amount detected by the flow rate sensor 70 reaches a set flow rate, the water supply valve 61 may be controlled to close.

In some examples, a water supply line L1 for supplying hot water, a water supply line L3 for supplying cold water, and a water supply line L2 for supplying cooling water may be branched at an arbitrary point of the water supply line L extending from an outlet end of the flow rate sensor 70.

In some implementations, a purified water discharge valve 66 may be mounted at an end of the water supply line L extending from the outlet end of the flow rate sensor 70. Further, a hot water discharge valve 64 may be mounted at an end of the water supply line L1 for supplying the hot water. Further, a cold water discharge valve 65 may be mounted at an end of the water supply line L3 for supplying the cold water. Further, a cooling water valve 63 may be mounted at an arbitrary point of the water supply line L2 for supplying the cooling water. The cooling water valve 63 adjusts an amount of cooling water supplied to a cold water generating unit 20.

In some examples, all of water supply lines respectively extending from outlet ends of the hot water discharge valve 64, the cold water discharge valve 65, and the purified water discharge valve 66 are connected to the water discharge hole. Further, as shown, the purified water, cold water, and hot water may be connected to a single discharge hole, or may be connected to independent discharge holes, respectively, in some cases.

Hereinafter, cold water and hot water supply processes will be described.

Regarding processing of the cold water, when the cooling water valve 63 is opened and the cooling water is supplied to the cold water generating unit 20, cold water is generated as the water in the water supply line L3 for supplying the cold water passing through the cold water generating unit 20 is cooled by the cooling water.

In some examples, the water supply line L2 for supplying the cooling water may be provided with a refrigerant cycle for cooling the cooling water. The refrigerant cycle may include a compressor, a condenser, an expansion valve, an evaporator, and the like.

Thereafter, when the cold water discharge valve 65 is opened by pressing a cold water selection button of an operation display, the cold water may be discharged through the water discharge hole.

Regarding processing of the hot water, when hot water is generated as water flowing along the water supply line L1 for supplying the hot water is heated by a hot water heater 30, and the hot water discharge valve 64 is opened by pressing a hot water selection button of the operation display, the hot water may be discharged through the water discharge hole.

The water purifier according to one embodiment of the present disclosure having the above-described configuration includes at least one water purifier filter to generate purified water from raw water. The water purifier filter will be described below.

Hereinafter, a filter for a water purifier according to one embodiment of the present disclosure will be described.

Figure 2:
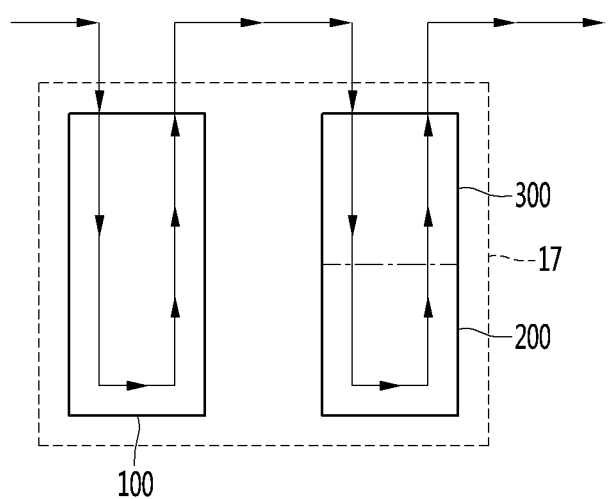
FIG. 2 is a conceptual diagram showing an example of a filter assembly.

FIG. 2 is a conceptual diagram showing an example of a filter assembly. FIG. 3 is a cross-sectional view showing an example of a pre carbon filter. FIG. 4 is a cross-sectional view showing an example of a composite filter.

Referring to FIGS. 2 to 4, a filter for a water purifier (hereinafter, referred to as a filter assembly) according to one embodiment of the present disclosure may include at least one of a pre carbon filter 100 having a carbon block 121 in a hollow tube form embedded therein, a hollow fiber membrane filter 200 having a plurality of hollow fiber membranes 220 embedded therein, or a post carbon filter 300 having a second carbon block 320 in a hollow tube form embedded therein.

As an example, the filter assembly 17 may include some or all of the pre carbon filter 100, the hollow fiber membrane filter 200, and the post carbon filter 300.

In some examples, the pre carbon filter 100 may include a filter housing 110 and a filter module 120.

The filter housing 110 may define an inlet 111 and an outlet 112. That is, water requiring purification flows through the inlet 111 and purified water is discharged through the outlet 112. Thus, the water is purified by the filter module 120 disposed between the inlet 111 and the outlet 112 while flowing between the inlet 111 and the outlet 112.

In addition, the filter housing 110 may define a space for accommodating the filter module 120 therein, and may include an upper cap 113 having the inlet 111 and the outlet 112 formed thereon. In some examples, the space of the filter housing 110 may be in communication with outside through the inlet 111 and the outlet 112 of the upper cap 113.

When the upper cap 113 is provided as described above, the filter module 120 may be easily mounted in the space of the filter housing 110 by opening the upper cap 113 and the filter module 120 accommodated in the filter housing 110 may be easily replaced.

The water flowed into the filter housing 110 through the inlet 111 may be purified while passing through the filter module 120. That is, foreign substances (e.g., heavy metals) contained in raw water such as tap water or the like may be removed while passing through the filter module 120.

In some implementations, a filter for a water purifier having an excellent effect of removing the heavy metals in the water may be provided.

For example, the filter module 120 may be formed by mixing activated carbon and a binder material with each other.

In addition, the filter module 120 may be formed by further mixing iron hydroxide and titanium oxide material thereto in order to increase a heavy metal removal performance.

The filter module 120 may include a carbon block 121 produced by mixing the materials as described above with each other to form a mixture and forming the mixture in a hollow block shape.

As an example, the carbon block 121 may be produced by mixing 40 to 50% by weight of the activated carbon, 5 to 15% by weight of the binder, 10 to 20% by weight of iron hydroxide, and 30 to 40% by weight of titanium oxide.

The titanium oxide may be provided as titanium dioxide or titanium tetraoxide.

Therefore, when the water containing the heavy metals passes through the filter module 120, the heavy metals in the water may be removed therefrom.

Further, the activated carbon may be contained in a form of granular or powder. As described above, when the carbon block 121 contains the activated carbon, the carbon block 121 may remove the heavy metal in the water and effectively remove the residual chlorine in the water at the same time. Accordingly, taste of the water may also be improved.

In addition, the chloroform ($CHCl_3$) in the water may be effectively removed by the activated carbon.

The binder is mixed to connect the activated carbon and the titanium oxide (e.g., $Na_4TiO_4$) and the iron hydroxide (ferric Hydroxide) with each other and to give rigidity.

With the configuration of the binder, the activated carbon and the titanium oxide (e.g., $Na_4TiO_4$) and the iron hydroxide (ferric Hydroxide) may be processed into a block form having rigidity.

For example, the filter module 120 may be formed by uniformly mixing the above-described materials with each other to form a mixture, putting the mixture in a mold, and heating the mixture. In the mold, the binder (e.g., polyethylene, PE) is melted by the heating to combine the activated carbon with the titanium oxide (e.g., $Na_4TiO_4$) and the iron hydroxide (ferric hydroxide). Therefore, a block-shaped carbon block 121 having overall rigidity may be formed.

In one example, in general, the water purifier is already equipped with several filters to remove the heavy metals and various foreign substances in the water. When the several filters are installed, the water purification performance may be ensured, but the flow rate of the purified water is inevitably reduced.

In addition, the existing water purifier has a limited space defined therein to install the filter, so that it is not easy to add a new filter. Further, each filter (e.g., activated carbon filter) installed in the water purifier basically has an individual function to improve the water purification performance. Therefore, it is not desirable to omit the existing filter for the addition of the new filter.

In some implementations, the activated carbon mixed in the carbon block 121 is in a state in which a surface thereof is modified by a method to be described below. Therefore, the heavy metal removal performance may be improved. The method for modifying the surface of the activated carbon will be described below.

Therefore, the heavy metals in the water may be removed without increasing the number of filters while maintaining original functions and effects of the activated carbon filter installed in the conventional water purifier. In addition, since the number of filters is not increased, a decrease in the flow rate of the purified water may be prevented.

Hereinafter, the method for modifying the surface of the activated carbon as described above will be described.

The method for modifying the surface of the activated carbon includes inserting the activated carbon into a chamber, injecting ozone generated from an ozone generator into the chamber and applying a pressure to the chamber, and modifying the surface of the activated carbon inserted into the chamber in a state in which the ozone is injected into the chamber and the pressure is applied to the chamber.

In the activated carbon inserted into the chamber, a range of a volume of micro pores of a total pore volume may correspond to 85 to 95% or a range of a volume of meso pores of the total pore volume may correspond to 5 to 15%.

For example, in the activated carbon inserted into the chamber, the volume of the micro pores of the total pore volume may correspond to about 90% and the volume of the meso pores of the total pore volume may correspond to about 10%.

In some examples, the activated carbon inserted into the chamber may have a thickness of 10 mm or less.

In some cases, the activated carbon may be disposed in a metal, glass, crucible, or plastic container and be inserted into the chamber.

As described above, when the activated carbon is inserted into the chamber, the ozone may be generated by the ozone generator using oxygen as a raw material.

In some examples, the ozone generator may generate the ozone using an oxygen bombe having oxygen of a ratio of 90% or more.

Then, the ozone generated from the ozone generator is injected into the chamber into which the activated carbon is inserted.

Then, ozone ($O_3$) may be filled in the chamber, and an internal pressure is formed in the chamber.

In some examples, the internal pressure may be maintained by the ozone ($O_3$) filled in the chamber. In some implementations, this pressurized state may be maintained for a set time to modify the surface of the activated carbon with the ozone.

For instance, the inserting step or the injecting step may further include inflowing high purity oxygen gas into the chamber for 10 to 60 minutes.

That is, in the inserting step or the injecting step, the high purity oxygen gas may be flowed into the chamber such that the surface modification of the activated carbon proceeds more actively, thereby forming an oxygen atmosphere.

Further, the injecting step may further include maintaining a range of 0.2 to 5 L/min of the oxygen flowed into the ozone generator.

For example, when the ozone is injected into the chamber, the ozone may be injected by setting a setting range of an oxygen flowmeter to 0.2 to 5 L/min.

In some implementations, the injecting step may further include injecting the ozone while maintaining a range of 0.001 to 0.1 MPa of an internal pressure of a discharge tube in the ozone generator.

In addition, the chamber may further include a discharge pipe in communication with an interior of the chamber and a valve for opening and closing the discharge pipe and the injecting step and the modifying step may further include maintaining a closed state of the discharge pipe.

The discharge pipe may be made of one of Teflon, polypropylene, stainless steel (SUS), or rubber.

Further, the modifying step may include maintaining a closed state of the chamber.

That is, in the injecting step and the modifying step, the valve may be installed on the ozone ($O_3$) gas discharge pipe made of one of the Teflon, polypropylene, SUS, and rubber and the valve may be closed to apply a pressure as a method for applying an ozone pressure in the chamber.

Further, the modifying step may further include maintaining a range of 0.05 to 1.5 bar of the ozone pressure in the chamber.

As an example, the ozone pressure in the chamber may be maintained at about 1 bar.

In addition, the modifying step may be performed for 60 to 300 minutes.

Hereinafter, element and heavy metal removal performances of the activated carbons based on whether surfaces thereof are modified will be compared with each other.

In a following description, the activated carbon includes existing activated carbon in which micro pores are developed used in the water purifier filter and activated carbon (CABOT Norit, KB EVN) in which meso pores are developed.

Further, pristine micro pore activated carbon and meso pore activated carbon not treated with ozone are represented as 'MiAC' and 'MeAC', respectively.

The 'MiAC' refers to activated carbon in which micro pores are developed so that a volume of the micro pores is large. For example, the volume of the micro pores is greater than a volume of the meso pore of MiAC.

In addition, the 'MeAC' refers to activated carbon in which meso pores are developed so that a volume of the meso pores is large. For example, the volume of the meso pores in MeAC is greater than a volume of the micro pores in MeAC.

Before discussing a heavy metal removal performance of ozone-treated activated carbon, manganese and zinc removal performances over time of the pristine MiAC and MeAC that are not treated with the ozone will be described below.

FIG. 5 is a table showing an example of manganese removal rates of the activated carbon, which is not surface-modified. FIG. 6 is a table showing an example of zinc removal rates of the activated carbon, which is not surface-modified.

Referring to FIG. 5, in the case of the pristine MiAC, a small amount of manganese may be removed for 30 seconds. However, the removal rate rather decreases over time and soon the manganese may not be removed at all.

Initially, physical adsorption by the pores occurred, but adsorbed manganese ions were released again due to continuous stirring over time, thereby decreasing the removal rate.

In one example, the pristine MeAC showed a higher manganese removal rate than that of the MiAC. However, the removal efficiency of the MeAC decreased as adsorbed manganese ions were released again due to continuous stirring over time.

Referring to FIG. 6, removal efficiencies of the zinc of the pristine MiAC and MeAC are higher than the removal efficiencies of the manganese thereof. The MeAC showed higher removal rates than the MiAC for two heavy metals of the manganese and the zinc, which is a result of pore characteristics of a material with large diameter pores.

A size of a hydrated heavy metal ion is large because the heavy metal ion in the water is present in a hydrated form, not as a single ion. Therefore, when the heavy metal ion is removed through adsorption, a material having a meso pore having a diameter of 2 to 50 nm is more effective for removing the heavy metal.

In addition, pore characteristics and surface chemistry characteristics of the pristine MiAC and MeAC were evaluated through $N_2$ adsorption-desorption isotherm analysis and XPS analysis, and results thereof are as shown in drawings and a table below.

Figure 7A:
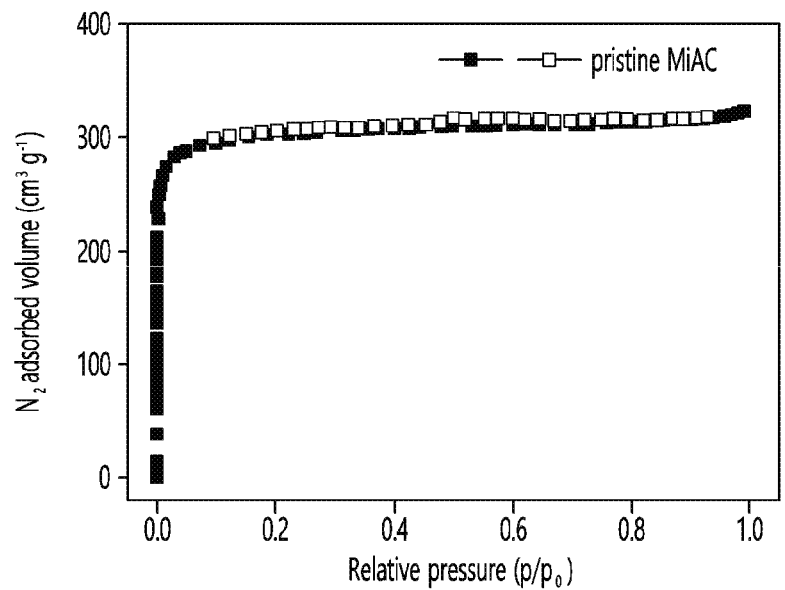
FIGS. 7A and 7B are graphs respectively showing example results of $N_2$ adsorption-desorption isotherms analysis of pristine micro pore active carbon (MiAC) and meso pore activated carbon (MeAC).
Figure 7B:
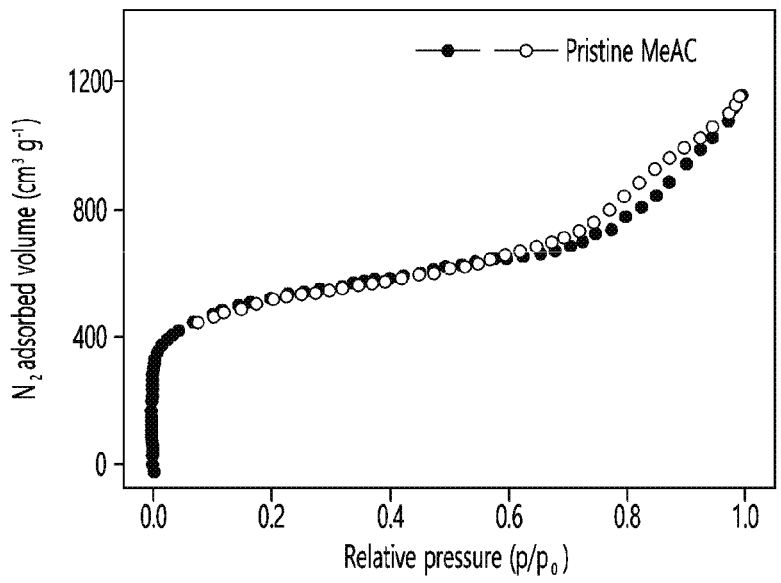
Figure 8A:
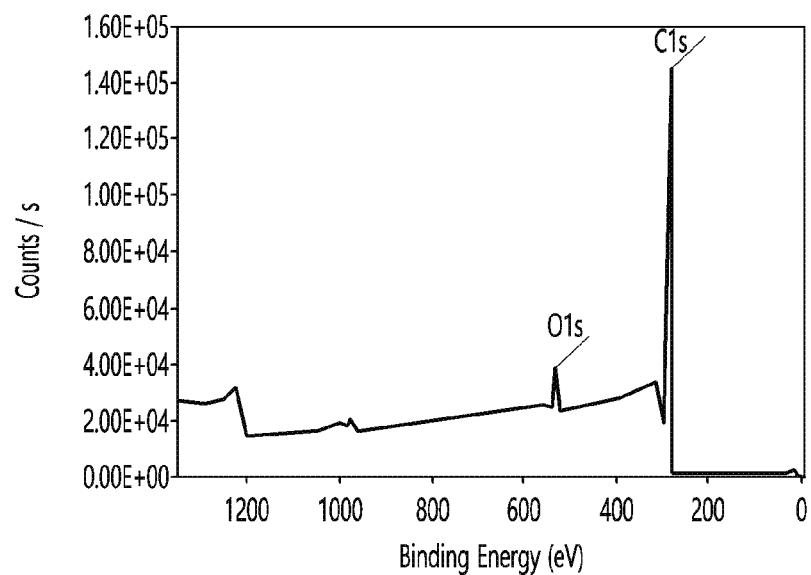
FIGS. 8A and 8B are graphs respectively showing examples of x-ray photoelectron spectroscopy (XPS) survey scan analysis results of pristine MiAC and MeAC.
Figure 8B:
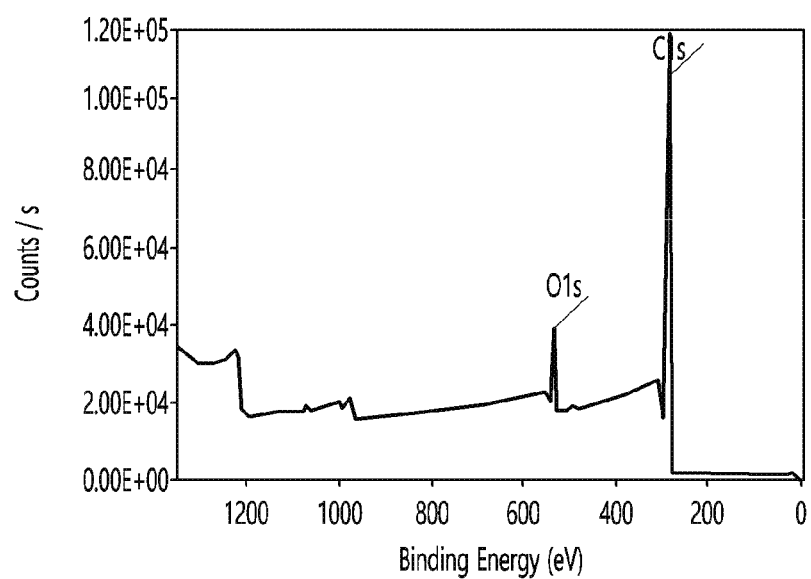

FIGS. 7A and 7B are graphs respectively showing an example of results of $N_2$ adsorption-desorption isotherms analysis of pristine MiAC and MeAC. FIGS. 8A and 8B are graphs respectively showing an example of XPS survey scan analysis results of pristine MiAC and MeAC. FIG. 9 is a table comparing examples of carbon and oxygen content of pristine MiAC and MeAC with each other.

Referring to FIGS. 7A to 9, the pristine MiAC, which is the activated carbon in which the micro pores are developed, has a specific surface area of 1205 $m^2/g$, a volume of the micro pores of 0.585 $cm^3/g$, and a volume of the meso pores of 0.042 $cm^3/g$. In addition, carbon content is 94.2 at % and oxygen content is 5.8 at %.

In addition, the pristine MeAC, which is the activated carbon in which the meso pores are developed, has a specific surface area of 1856 $m^2/g$, a volume of the micro pores of 0.730 $cm^3/g$, and a volume of the meso pores of 1.080 $cm^3/g$. In addition, carbon content is 89.1 at % and oxygen content is 10.9 at %. In addition, since the pristine MeAC has higher pore characteristics than the MiAC and has a relatively high oxygen content, effects of removing the manganese and the zinc thereof is higher than that of the MiAC.

Hereinafter, changes in components and heavy metal removal rates of the ozone-treated activated carbons, that is, the surface-modified activated carbons will be compared with each other.

In a description below, the micro pore activated carbon and meso pore activated carbon that are not treated with the ozone are denoted as the 'MiAC' and the 'MeAC', respectively. Activated carbons that are treated with the ozone over time of 10, 30, 60, 120 minutes, and the like were marked with 'o' before names followed by the number of time.

For example, samples in which the MiAC and the MeAC are treated with the ozone for 120 minutes may be represented as 'oMiAC120' and 'oMeAC120', respectively.

First, the carbon and oxygen contents of the MiAC and the MeAC were derived through the XPS analysis, based on ozone treatment time, and results thereof are as shown in FIGS. 10 to 11.

FIGS. 10 to 11 are tables comparing changes in carbon and oxygen contents of oMiAC and oMeAC with each other for each ozone treatment time.

Referring to FIG. 10, Present Examples 1 to 7 are results of measurement of changes in element contents and heavy metal removal rates of MiAC, which are results of inputting MiAC of a thickness of 10 mm in a chamber and varying the ozone treatment time in a state in which an oxygen flow rate thereof is 4 L/min, an ozone discharge tube pressure is 0.05 MPa, and a chamber ozone pressure is 1 bar.

In FIG. 10, Present Examples 8 to 15 are results of measurement of changes in element contents and heavy metal removal rates of MeAC, which are results of inputting MeAC of a thickness of 10 mm in a chamber and varying the ozone treatment time in a state in which an oxygen flow rate thereof is 4 L/min, an ozone discharge tube pressure is 0.05 MPa, and a chamber ozone pressure is 1 bar.

In FIG. 10, Comparative Example 1 is a result of measurement of changes in element contents and a heavy metal removal rate of MiAC that is not treated with the ozone.

In FIG. 10, Comparative Example 2 is a result of measurement of changes in element contents and a heavy metal removal rate of MeAC that is not treated with the ozone.

Referring to FIGS. 10 to 11, in the case of the MiAC, the oxygen content may be maximized in a sample in which the MiAC is ozone-treated for 60 minutes (see Present Example 4 of FIG. 10), and, in the case of the MeAC, the oxygen content may be maximized in a sample in which the MeAC is ozone-treated for 120 minutes (see Present Example 12 of FIG. 10).

In addition, in case of a sample according to Present Example 12, that is, meso pore activated carbon (oMeAC120) ozone-treated for 120 minutes, it may be seen that the oxygen content is increased compared to a sample according to Comparative Example 2, that is, untreated meso pore activated carbon (MeAC).

Figure 17:
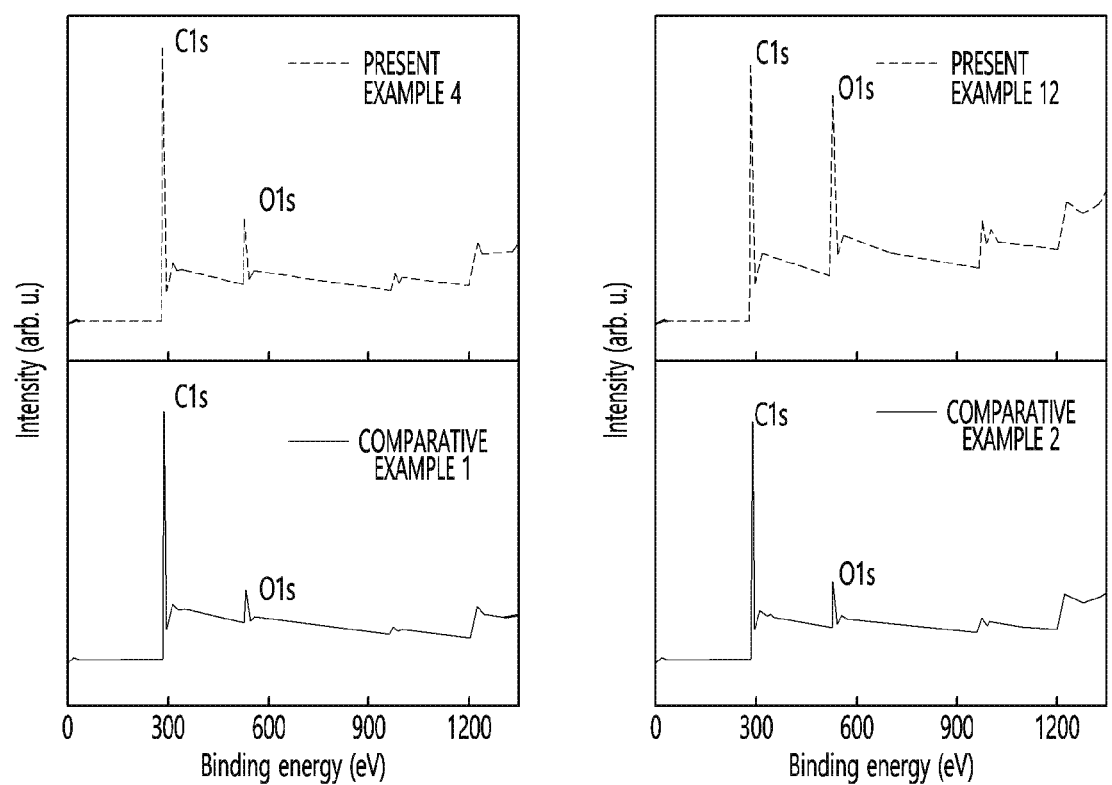
FIG. 17 shows graphs showing example results of carbon and oxygen contents analysis of pristine activated carbon and modified activated carbon.

FIG. 17 shows graphs representing examples of results of X-ray photoelectron spectroscopy (XPS) analysis of the samples according to Present Examples 4 and 12 of FIG. 10 and samples that are not ozone-treated.

Referring to FIG. 17, in case of a sample according to Present Example 4, that is, micro pore activated carbon (oMiAC60) ozone-treated for 60 minutes, it may be seen that the oxygen content is increased compared to a sample according to Comparative Example 1, that is, untreated micro pore activated carbon (MiAC).

Further, manganese and zinc removal experiments were conducted for 30 minutes to compare efficiencies of removing manganese and zinc of activated carbons for each ozone treatment time with each other and firstly identify the most effective sample, and results thereof are shown in FIGS. 12 to 14.

FIGS. 12 to 14 are tables comparing examples of heavy metal removal rates of oMiAC and oMeAC with each other for each ozone treatment time.

First, in the case of the manganese, oMiAC60 that is ozone-treated for 1 hour (60 minutes) among the micro pore activated carbons (oMiACs) showed a manganese removal rate of up to 34.3%. It may be seen that the removal rate is improved about 6 times than that of up to 6% of the MiAC, which is the sample that is not ozone-treated.

In some examples, oMeAC120 that is ozone-treated for 2 hours among the meso pore activated carbons (oMeACs) showed a manganese removal rate of up to 94.9%. It may be seen that the removal rate is improved about 3 times than that of up to about 30% of the MeAC, which is the sample that is not ozone-treated.

In one example, in the case of the zinc, oMiAC60 that is ozone-treated for 1 hour among the micro pore activated carbons (oMiACs) showed a zinc removal rate of up to 33.2%. It may be seen that the removal rate is improved compared to that of up to 15% of the MiAC, which is the sample that is not treated.

Further, oMeAC120 that is ozone-treated for 2 hours among the meso pore activated carbons (oMeACs) showed a zinc removal rate of up to 97.5%. It may be seen that the removal rate is improved 2.5 times or more compared to that of up to about 38% of the MiAC, which is the sample that is not treated.

Therefore, the ozone treatment effect of the activated carbon in which the meso pores are developed is superior to that of the activated carbon in which the micro pores are developed. Further, it may be seen that the heavy metal removal effect is also sharply improved.

Figure 15:
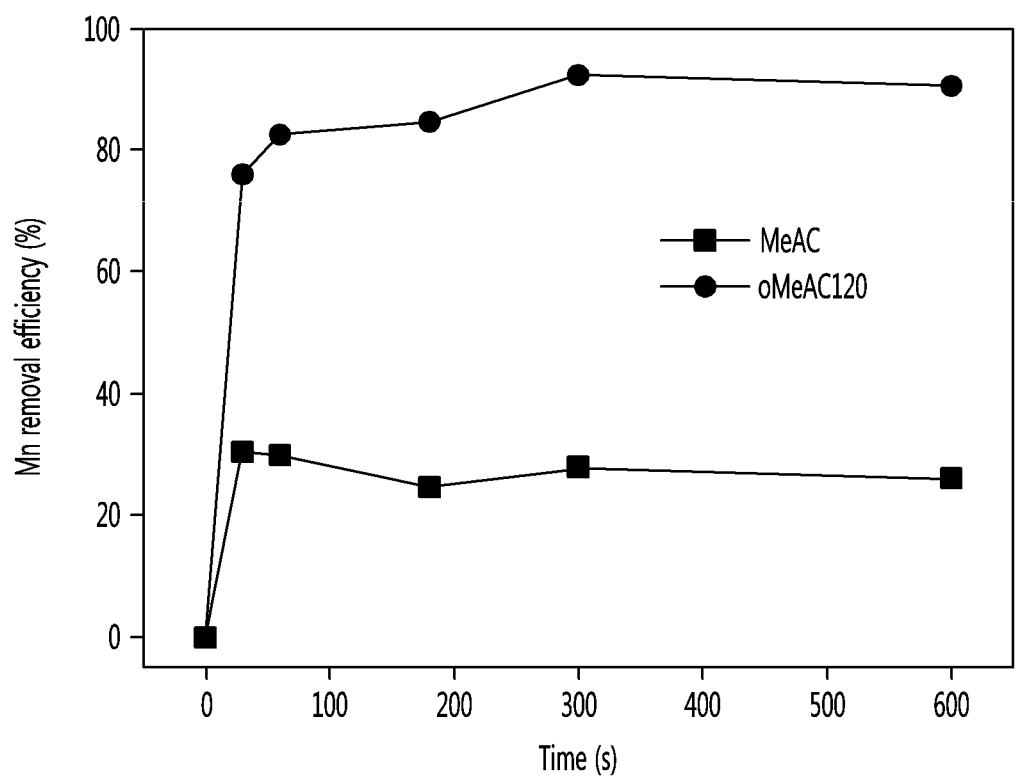
FIG. 15 is a graph showing an example of manganese removal rates of MeAc and meso pore activated carbon (oMeCA120) that is ozone-treated for 2 hours.
Figure 16:
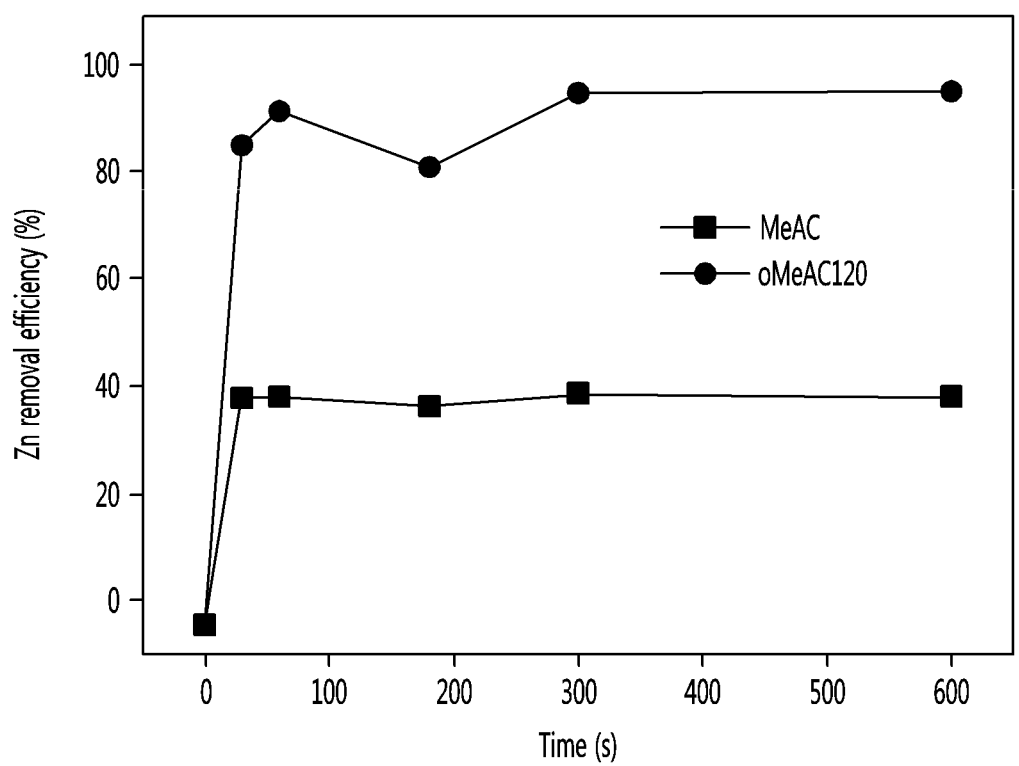
FIG. 16 is a graph showing an example of zinc removal rates of MeAC and meso pore activated carbon (oMeCA120) that is ozone-treated for 2 hours.

In addition, manganese and zinc removal experiments over time of the 'oMeAC120', which is the meso pore activated carbon (oMeAC) that is ozone-treated for 2 hours were conducted and results thereof are as shown in FIGS. 15 to 16.

FIG. 15 is a graph comparing manganese removal rates with each other for each treatment time of meso pore activated carbon that is ozone-treated for 2 hours. In addition, FIG. 16 is a graph comparing zinc removal rates with each other for each treatment time of meso pore activated carbon that is ozone-treated for 2 hours.

Referring to FIGS. 15 to 16, it may be seen that the oMeAC120 maintains a high removal rate in a short time like the untreated sample (MeAC) and a removal efficiency is improved about 2.5 times or more compared to the untreated sample (MeAC).

Figure 18A:
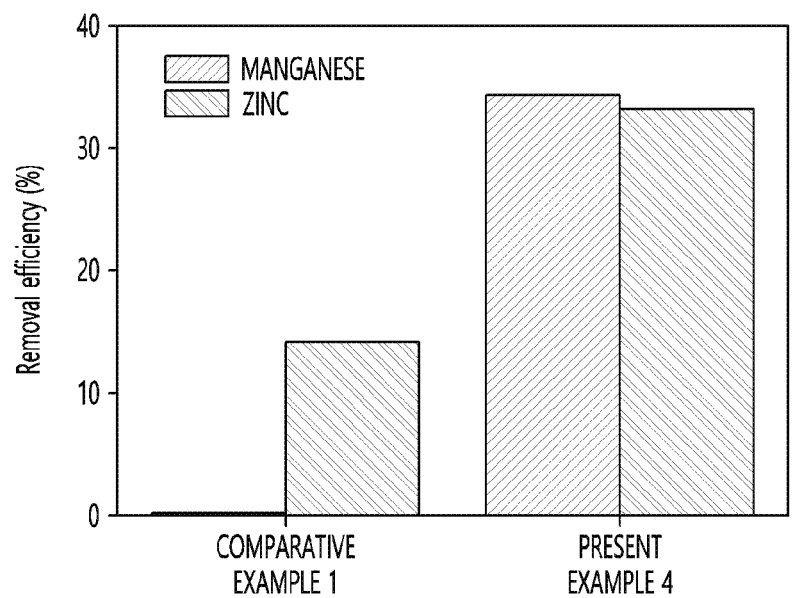
FIGS. 18A and 18B are graphs showing examples of heavy metal removal rates of pristine activated carbon and modified activated carbon with each other.
Figure 18B:
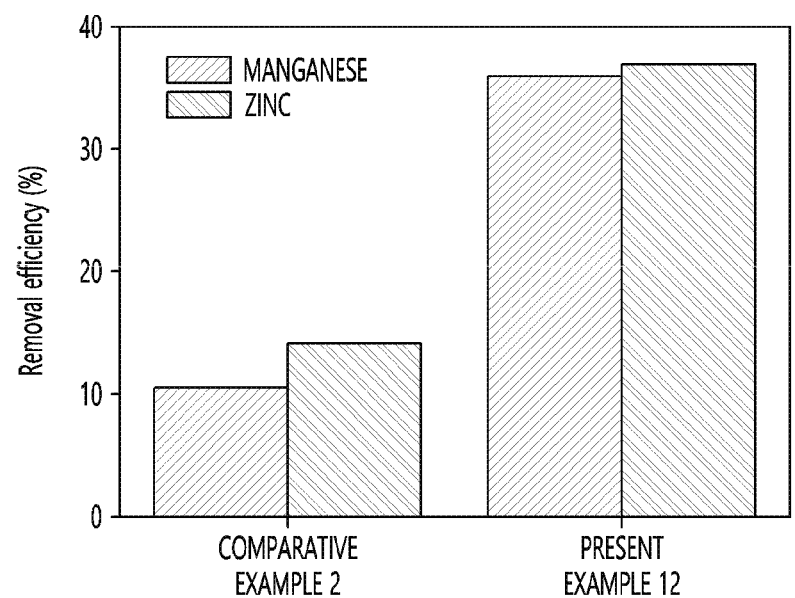

FIGS. 18A and 18B are graphs showing an example of manganese and zinc removal rates of the samples according to Present Examples 4 and 12 of FIG. 10 and the samples that is not ozone-treated.

Referring to FIGS. 18A and 18B, in the case of the sample according to Present Example 4, that is, the micro pore activated carbon (oMiAC60) ozone-treated for 60 minutes, it may be seen that the manganese and zinc removal rates are improved compared to the sample according to Comparative Example 1, that is, the untreated micro pore activated carbon (MiAC).

Further, in the case of the sample according to Present Example 12, that is, the meso pore activated carbon (oMiAC120) ozone-treated for 120 minutes, it may be seen that the manganese and zinc removal rates are improved compared to the sample according to Comparative Example 2, that is, the untreated meso pore activated carbon (MeAC).

Further, referring to FIG. 4 again, when the hollow fiber membrane filter 200 and the post carbon filter 300 are provided, as the water flowed into the filter assembly 17 passes through the pre carbon filter 100, the hollow fiber membrane filter 200, and the post carbon filter 300, the water purification takes place several times. Thus, the removal of various foreign substances including the heavy metals proceeds more reliably.

In particular, the chlorine component and the chloroform ($CHCl_3$) in the water may be more reliably removed by the post carbon filter 300 further provided.

In the present embodiment, the hollow fiber membrane filter 200 and the post carbon filter 300 may be accommodated in one filter housing 400 to constitute the composite filter. In some examples, the hollow fiber membrane filter 200 and the post carbon filter 300 may be arranged in a line such that the water passed through the hollow fiber membrane filter 200 passes through the post carbon filter 300.

In detail, the hollow fiber membrane filter 200 includes a first auxiliary filter housing 210 and the hollow fiber membrane 220. Further, the post carbon filter 300 includes a second auxiliary filter housing 310 and the second carbon block 320. Further, the auxiliary filter housings 210 and 310 are accommodated inside the filter housing 400.

As described above, when the hollow fiber membrane filter 200 and the post carbon filter 300 are arranged in a line in one filter housing 400, a purified water flow rate may be maintained while increasing a filtration efficiency.

In addition, without a need to expand a filter installation space defined in the water purifier, the present disclosure may be applied immediately by simply replacing the existing filter.

In addition, a space utilization may be increased by reducing a volume of the filter and further the water purifier may be implemented slimly.

As described above, the raw water flowed into the water purifier is purified, while passing through the pre carbon filter 100 and the composite filter 200 and 300.

In detail, the raw water flowed into the pre carbon filter 100 is firstly filtered while passing through an anion exchange resin non-woven fabric 122 and is secondarily filtered while passing through the carbon block 121 in which the activated carbon, the binder, the iron hydroxide, and the titanium oxide are mixed with each other. Then, the water is discharged out of the pre carbon filter 100.

The water discharged from the pre carbon filter 100 as described above is flowed into the composite filter 200 and 300.

The raw water flowed into the composite filter 200 and 300 is flowed into the hollow fiber membrane filter 200 and then is thirdly filtered while passing through the hollow fiber membrane 220. Thereafter, the water discharged from the hollow fiber membrane filter 200 flows into the post carbon filter 300, is fourthly filtered while passing through the second carbon block 320, and then is discharged out of the post carbon filter 300.

Therefore, the raw water flowed into the filter assembly 17 may be purified into a state of purified water from which the heavy metals and foreign substances are removed while going through the plurality of filtration processes as described above.

In some implementations, when the water passes through the carbon block 121 in which the activated carbon, the binder, the iron hydroxide, the titanium oxide are mixed with each other as described above, nine kinds of heavy metals, that is, mercury, lead, copper, aluminum, iron, cadmium, arsenic, manganese, and zinc may be removed therefrom.

In detail, the mercury, the lead, the iron, the aluminum, the cadmium, the arsenic, and the copper may be removed by the iron hydroxide in the carbon block 121. Further, the manganese and the zinc may be removed by the titanium oxide in the carbon block 121.

In some implementations, the surface of the activated carbon contained in the carbon block is in a modified state by the ozone-treatment.

Accordingly, as the activated carbon is oxidized, the oxygen content of the activated carbon itself is increased and the carbon content thereof is reduced.

Further, due to the increase in the oxygen content, the surface functional groups of the activated carbon are increased.

In some implementations, removal of heavy metal ions on the surface of the activated carbon may proceed more actively. As a result, the heavy metal removal rate of the activated carbon may be increased.

What is claimed is:

1. A method for treating activated carbon configured to be included in a carbon block of a filter for a water purifier, the method comprising:
    providing the activated carbon having micro pores and meso pores;
    determining whether the activated carbon is (i) meso pore activated carbon (MeAC) having a volume of the meso pores greater than a volume of the micro pores or (ii) micro pore activated carbon (MiAC) having a volume of the micro pores greater than a volume of the meso pores,
    inserting the activated carbon into a chamber;
    injecting ozone generated from an ozone generator into the chamber, and applying pressure to the chamber; and
    modifying a surface of the activated carbon inserted into the chamber based on applying the pressure to the chamber that holds the ozone and the activated carbon,
    wherein modifying the surface of the activated carbon comprises:
        based on determining that the activated carbon is the MeAC, applying a first ozone-treated time to the activated carbon in the chamber, and
        based on determining that the activated carbon is the MiAC, applying a second ozone-treated time to the activated carbon in the chamber, the first ozone-treated time being longer than the second ozone-treated time.

2. The method of claim 1, wherein, before modifying the surface of the activated carbon, the volume of the micro pores in the activated carbon inserted into the chamber is 90% or more of a total pore volume of the activated carbon inserted into the chamber.

3. The method of claim 1, wherein inserting the activated carbon into the chamber comprises inserting the activated carbon having a thickness of 10 mm or less into the chamber.

4. The method of claim 1, wherein injecting the ozone comprises generating the ozone by the ozone generator using oxygen as a raw material.

5. The method of claim 4, wherein generating the ozone comprising generating the ozone by the ozone generator using an oxygen bomb having 90% or more pure oxygen.

6. The method of claim 1, wherein inserting the activated carbon or injecting the ozone comprises inflowing oxygen gas into the chamber for 10 to 60 minutes.

7. The method of claim 1, wherein injecting the ozone comprises maintaining an oxygen inflow into the ozone generator with a flow rate in a range from 0.2 to 5 L/min of oxygen.

8. The method of claim 1, wherein injecting the ozone comprises maintaining an internal pressure of a discharge tube of the ozone generator within a predetermined range.

9. The method of claim 8, wherein maintaining the internal pressure of the discharge tube comprises maintaining the internal pressure of the discharge tube in a range of 0.001 to 0.1 MPa.

10. The method of claim 1, wherein injecting the ozone and modifying the surface of the activated carbon comprise:
maintaining a closed state of a discharge pipe, the discharge pipe being connected to the chamber and configured to communicate with an interior of the chamber based on operation of a valve.

11. The method of claim 10, wherein maintaining the closed state of the discharge pipe comprises closing the valve, the discharge pipe being made of one of polypropylene, stainless steel (SUS), or rubber.

12. The method of claim 1, wherein modifying the surface of the activated carbon comprises maintaining the chamber in a closed state.

13. The method of claim 1, wherein modifying the surface of the activated carbon comprises maintaining an ozone pressure in the chamber in a range of 0.05 to 1.5 bar.

14. The method of claim 1, wherein modifying the surface of the activated carbon is performed for 60 to 300 minutes.

15. A filter for a water purifier, the filter comprising:
a filter housing that defines an inlet and an outlet; and
a filter module disposed inside the filter housing and configured to purify water received through the inlet and supply purified water to the outlet,
wherein the filter module comprises a carbon block including activated carbon, the activated carbon having been treated by operations comprising:
providing the activated carbon having micro pores and meso pores;
determining whether the activated carbon is (i) meso pore activated carbon (MeAC) having a volume of the meso pores greater than a volume of the micro pores or (ii) micro pore activated carbon (MiAC) having a volume of the micro pores greater than a volume of the meso pores,
inserting the activated carbon into a chamber,
injecting ozone generated from an ozone generator into the chamber, and applying pressure to the chamber,
modifying a surface of the activated carbon inserted into the chamber based on applying the pressure to the chamber that holds the ozone and the activated carbon, and wherein modifying the surface of the activated carbon comprises:
based on determining that the activated carbon is the MeAC, applying a first ozone-treated time to the activated carbon in the chamber, and
based on determining that the activated carbon is the MiAC, applying a second ozone-treated time to the activated carbon in the chamber, the first ozone-treated time being longer than the second ozone-treated time.

16. The filter of claim 15, wherein, before modifying the surface of the activated carbon, the volume of the micro pores is activated carbon inserted into the chamber is 90% or more of a total pore volume of the activated carbon inserted into the chamber.

17. The filter of claim 15, wherein inserting the activated carbon inserted into the chamber comprises inserting the activated carbon having a thickness of 10 mm or less into the chamber.

18. The filter of claim 15, wherein injecting the ozone comprises maintaining an oxygen inflow into the ozone generator with a flow rate in a range from 0.2 to 5 L/min of oxygen.

19. The filter of claim 15, wherein injecting the ozone comprises maintaining an internal pressure of a discharge tube of the ozone generator in a range of 0.001 to 0.1 MPa.

20. The filter of claim 15, wherein modifying the surface of the activated carbon comprises maintaining an ozone pressure in the chamber in a range of 0.05 to 1.5 bar.

* * * * *